United States Patent [19]
Leary et al.

[11] 3,981,895
[45] Sept. 21, 1976

[54] NOVEL AUTOXIDATIVE DERIVATIVES OF MALEINIZED MONOCARBOXYLIC FATTY ACID

[75] Inventors: Bruce Leary, Frankston; Frederick John Lubbock, Beaumaris, both of Australia

[73] Assignee: Dulux Australia Ltd., Melbourne, Australia

[22] Filed: Nov. 29, 1974

[21] Appl. No.: 528,546

[30] Foreign Application Priority Data
Dec. 11, 1973  Australia............................. 5951/73

[52] U.S. Cl................................ 260/404.8; 260/398
[51] Int. Cl.²......................... C09F 5/00; C09F 7/00
[58] Field of Search............... 260/404.8, 410.6, 398

[56] References Cited
UNITED STATES PATENTS

| | | | |
|---|---|---|---|
| 2,820,711 | 1/1958 | Kiebler | 260/404.8 X |
| 2,909,496 | 10/1959 | Cooke | 260/22 |
| 3,141,897 | 7/1964 | Crecelius | 260/404.8 |
| 3,253,938 | 5/1966 | Hunt | 260/404.8 X |
| 3,422,044 | 1/1969 | Erikson | 260/404.8 |

*Primary Examiner*—Winston A. Douglas
*Assistant Examiner*—John F. Niebling
*Attorney, Agent, or Firm*—Cushman, Darby & Cushman

[57] ABSTRACT

Novel derivatives of maleinized fatty acids are disclosed. The derivatives comprise mono-esters of both a selected type of diol and an alkylene oxide, they contain free carboxyl and hydroxyl groups and have acid values of 40–100 mg KOH per g. They are useful film-forming components of high-solids coating compositions.

2 Claims, No Drawings

NOVEL AUTOXIDATIVE DERIVATIVES OF MALEINIZED MONOCARBOXYLIC FATTY ACID

This invention relates to novel derivatives of maleinised autoxidisable fatty acids.

According to this invention we provide a derivative of an autoxidizable maleinised monocarboxylic fatty acid comprising 1 mol of maleic anhydride per mol of monocarboxylic fatty acid, the said derivative having both carboxyl and hydroxyl groups and consisting of:

1. a mono-ester of a diol selected from 2, 2-bis (4-hydroxy cyclohexyl)propane and the reaction product of 1 mol of 2, 2-bis (p-hydroxy phenyl)-propane with 2 mol of an alkylene oxide selected from ethylene, propylene and butylene oxide, and
2. a mono-ester of an alkylene oxide selected from ethylene, propylene and butylene oxide and a compound of the formula

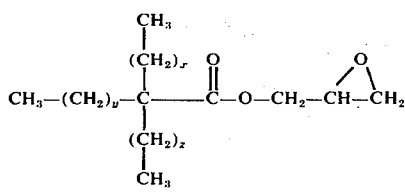

where $x$, $y$ and $z$, which may be the same or different within the one molecule, are integers and $x + y + z = 4-6$ inclusive;

and further characterised in that the acid value of the derivative is 40–100 mgm KOH/gm.

The autoxidizable maleinised mono-carboxylic fatty acids from which our novel compositions are derived comprise equimolar amounts of maleic anhydride and monocarboxylic fatty acids. Suitable autoxidizable fatty acids which will undergo a maleinisation reaction with maleic anhydride and the process itself are well known to the art, being described in, for example, "The Chemistry of Organic Film Formers" by D. H. Solomon (1967, John Wiley & Sons Inc.) pp 68–71. Thus the fatty acid may be, for example, a pure 9 : 11 conjugated diene, e.g. linoleic acid. However, the autoxidizable fatty acids commonly used in such reactions are tall oil fatty acids and acids derived from naturally occurring triglyceride oils, for example linseed, safflower, soya, sunflower, dehydrated castor and tung oil fatty acids, and these are known to consist of mixtures of fatty acids not all of which are dienes, for example, soya oil fatty acids typically consists of a mixture of palmitic, oleic, ricinoleic, linolenic and linoleic acids in varying amounts, a minor proportion of the mixture not entering into a maleinisation reaction with maleic anhydride. We have found, however, that these naturally occurring mixtures of fatty acids are quite satisfactory for use in the preparation of the novel products of our invention, the impurities present not appearing to interfere with their useful properties. One consequence of the presence of such impurities is that they will have an effect on the amount of maleic anhydride required in the maleinisation reaction. It has been our experience, however, that provided the molar ratio of maleic anhydride to fatty acids, assuming the fatty acids to be a pure diene, is 0.8–1.2 to 1.0, this is a sufficiently accurate approximation to the required equimolar ratio.

The derivative comprises two monoesters of the one parent maleinised monocarboxylic, fatty acid which have been referred to hereinabove. The first-mentioned mono-ester (hereinafter referred to as "mono-ester No. 1") is a mono-ester of a diol selected from 2, 2-bis (hydroxy cyclohexyl) propane (for example, the commercially-available material marketed under the trade mark "hydrogenated Bisphenol A") and the reaction product of 1 mol of 2, 2-bis (p-hydroxyphenyl)propane (for example, the commercially-available material marketed under the trade mark "Bisphenol A") and 2 mol of an alkylene oxide selected from those alkylene oxides mentioned hereinabove. The second mono-ester (hereinafter referred to as "mono-ester No.2") is a mono-ester of an alkylene oxide selected from those alkylene oxides mentioned hereinabove. The compound of formula

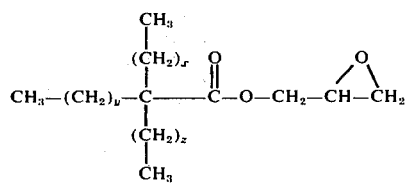

referred to hereinabove, is commercially available as "Cardura" E (registered trade mark). It has been found that derivatives incorporating a mono-ester of a "Cardura" E-type entity have especially advantageous properties and for some special purposes these are our preferred derivatives.

A derivative according to our invention may be prepared by, for example, the following stages:

a. One mol of an autoxidative monocarboxylic fatty acid is heated with one mol of maleic anhydride to form a maleic anhydride-fatty acid adduct.
b. The adduct is reacted with one of the specified diols.
c. The product of this reaction is then reacted with a selected alkylene oxide.

The novel derivatives of this invention have, when blended with a sufficient proportion of a crosslinking agent proved useful as film-forming components of coating compositions. The cross-linking agent may be chosen from the wide range known to the art but we have found that an especially good one is hexamethoxymethylmelamine (for example the commercially available product of this type sold under the trade mark "Cymel") and this is our preferred cross-linking agent. Coating compositions utilising blends of novel derivatives according to our invention with crosslinking agents as the sole film-formers have acceptable application viscosities at unusually high solids contents (in excess of 80% by weight in the case of solvent-borne coatings), an important factor in the preparation of pollution free coatings. In addition, it is possible to prepare water-borne coating compositions incorporating novel derivatives according to the invention by adding sufficient water-soluble base to neutralise the carboxyl groups; this provides an almost complete absence of potential pollutant at the cost of a reduction of non-volatile content. A novel derivative according to this invention blended with a suitable cross-linking agent may then be added to a conventional film-forming composition, to enhance the properties and raise the solids content thereof. There are many possibilities in this area which will be obvious to persons skilled in the art once the underlying principle has been comprehended.

The invention is further illustrated by the following examples in which all parts are expressed by weight:

EXAMPLE 1

Preparation of a novel derivative where mono-ester No. 1 is the mono-ester of the reaction product of 2 mol of propylene oxide with 1 mol of 2, 2-bis (p-hydroxy phenyl) propane ("Bisphenol" A) and mono-ester No.2 is the mono-ester of propylene oxide.

The preparation was carried out as follows:

A. 228.0 parts of "Bisphenol" A was charged to a reaction vessel equipped with stirrer, heating mantle, thermometer and efficient condenser, heated until it melted and the temperature held at 150°–160°C.

B. 1.0 parts "Armeen" DMCD (a tertiary amine catalyst — "Armeen" is a registered trade mark) was then added, followed by a slow addition of 116.0 parts of propylene oxide to maintain a steady reflux at about 150°C. This addition was made over a period of 3 hours. Heating was continued for 30 minutes after the addition of propylene oxide was complete at which point reaction was substantially complete as assessed by examination of the infrared spectrum of a sample of the batch.

C. The mixture was cooled to 130°C and 392.0 parts maleinised linseed oil fatty acid (97% weight solids in xylene: 1 maleic anhydride residue per acid molecule) added. The temperature was raised to 150°C and held there for half an hour until ring opening of the maleic anhydride was complete. This was again verified by examination of the infra-red spectrum of a sample of the batch.

D. 0.5 parts "Armeen" DMCD and 58.0 parts propylene oxide were added as in Stage B above. The temperature was held at 150°C and the mixture held at reflux until the acid value fell to 71 mgm KOH per gm.

The product was a viscous liquid with a solid content of 97% by weight.

EXAMPLE 2

Preparation of a novel derivative identical to that prepared in Example 1 except that mono-ester No.2 is a mono-ester of a compound of the formula

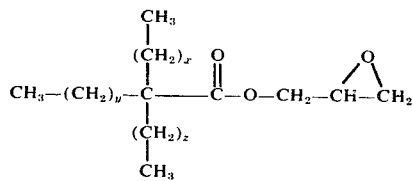

The particular compound used is available commercially under the name "Cardura" E (registered trade mark). The commercial material is a mixture of compounds and so no precise formula can be given, but all of the compounds in the mixture fall within the limits which we have set out hereinabove.

The materials used in the preparation were identical to those of Example 1 except for the substitution in Stage D of 245 parts of "Cardura" E for 58 parts of propylene oxide.

A procedure identical to that of Example 1 was followed.

The final product had an acid value of 43 mgm KOH per gm and a solids content of 95.7% by weight.

EXAMPLE 3

Preparation of a novel derivative where mono-ester No.1 is the mono-ester of 2,2-bis(4-hydroxycyclohexyl) propane ("hydrogenated Bisphenol A"), and mono-ester No.2 is the mono-ester of butylene oxide.

392 parts of a maleinised safflower oil fatty acid (97% weight solids in xylene and comprising 1 maleic anhydride residue per fatty acid molecule) and 240 parts "hydrogenated Bisphenol A" were changed to a reaction vessel equipped with stirrer, heating mantle, thermometer and efficient condenser. The mixture was heated to 150°–160°C and held there for 30 minutes at which point ring opening was complete as assessed by the infra-red spectrum of a sample of the batch.

The temperature was then lowered to 140°C and 72 parts of butylene oxide and 0.5 parts of "Armeen" DMCD were added slowly with very slow stirring. The temperature was raised to 165°–168°C and held there until the acid value fell to 66 mg KOH per gm.

The product was a viscous liquid with a solids content of 95% by weight.

EXAMPLE 4

Preparation of a coating composition utilising a novel derivative according to the invention and a comparison of this coating composition with a conventional material.

The following materials were ball-milled together until a dispersion of particle size 10–15 micron (as measured on a Hegmann gauge) was achieved:

| | | |
|---|---|---|
| Rutile titanium dioxide | 7.29 | parts |
| Barytes | 23.44 | '' |
| Silica | 0.26 | '' |
| Anti-skinning agent* | 0.20 | '' |
| Montmorillionite based anti-settling agent | 0.15 | '' |
| Novel derivative from Example 2 (97% solids) | 1.97 | '' |
| Butyl acetate | 4.00 | '' |
| Iso-butanol | 1.00 | '' |

*A commercial grade of 2–6 ditertiary butyl 4-methylphenol was used.

The following components were then stirred until homogeneous.

| | | |
|---|---|---|
| Ball milled mixture (from above) | 38.31 | parts |
| Novel composition from Example 1 (thinned to 80% solids by wt. in methyl ethyl ketone) | 14.20 | '' |
| Methyl ethyl ketone | 2.00 | '' |
| Hexamethoxy methyl melamine* | 3.44 | '' |

*A commercial product called "Cymel" 301 (registered trade mark) was used.

The resulting coating composition was used as an undercoat for a thermosetting acrylic enamel, the dry film builds being 50 micron for the undercoat and 40 micron for the acrylic enamel. The undercoat was sprayed on to phosphated steel panels and baked in an oven for 30 minutes at 177°C. The acrylic enamel was then applied and baked for 30 mins at 129°C.

A conventional automotive epoxy ester primer was used as control and a similar series of panels was prepared.

The panels were subjected to the following tests:

a. Test to determine adhesion of undercoat to metal

This was carried out in accordance with Test Method BI 6-1, Part A of the Ford Motor Company, one of a series of test methods well known to the art. It involves cross-scribing a coated panel, applying a strip of adhesive tape over the cross scribes, pulling the strip away and estimating the adhesion from the amount of paint remaining at the cross scribes.

b. Test to determine adhesion of top coat to undercoat

This was carried out along the lines of Ford Test Method BI6-1, Part B, except that the scribes do not go through to the metal but only to the undercoat.

c. Gravellometer test

In this test a panel is hung vertically in a gravellometer and then bombarded with 400 g of fresh gravel blown at the panel by an air blast. The air blast has a pressure of 80 p.s.i. and the bombardment takes place over a period of 10 seconds. The paint film on the panel is assessed on a scale of from 1 to 10 where 1 represents no damage and 10 complete removal of the paint film.

d. Impact test

This test was carried out in the manner prescribed by Specification 20/38, part 4 (a) of Chrysler Australia Ltd. The panel is subjected to an impact force of 80 in 1b and examined for cracking.

e. Flexibility test

This test is identical to that of Ford Test Method BI 5-1. The panel is bent through 180° on a conical mandrel and checked for damage to the film, the film being rated on a flexibility scale of from 1 to 5 with 1 best and 5 worst.

f. Salt spray test

This test was carried out in the manner prescribed by Ford Test Method BI 3-1 except that the panels were exposed for 350 hours. A line is scribed through the paint film to the metal along the longtitudinal axis of the panel before testing and at the end of the test, the extent of corrosion is measured from the scribe line.

g. Humidity test

This test was carried out in the manner prescribed by Ford Test Method BI 4-2 except that the temperature of the test was raised from 43°C to 60°C, thus making the test more severe. The panels were exposed to a high humidity atmosphere in a Cleveland humidity cabinet for 240 hours and the degree of blistering measured by reference to the "Exposure Standards Manual" of the Federation of Societies for Paint Technology. In this Manual, blisters are rated for size by an arbitrary numerical scale from 10 to 0 (10 representing no blistering) and for frequency by a series of ratings which are as follows; D (dense), MD (medium dense), M (medium) and F (few).

The results were as follows:

|     |                     | Epoxy ester primer. | Undercoat comprising novel derivative. |
| --- | ------------------- | ------------------- | -------------------------------------- |
| (a) | Adhesion to metal   | Excellent           | Excellent                              |
| (b) | Intercoat adhesion  | Good                | Good                                   |
| (c) | Gravellometer       | 9½                  | 8½                                     |
| (d) | Impact              | No cracking         | Slight cracking                        |
| (e) | Flexibility         | 4                   | 2                                      |
| (f) | Salt spray          | 1 mm                | 1 mm                                   |
| (g) | Humidity            | 8F                  | 6M                                     |

Comparison of the properties of the undercoat comprising a novel derivative according to the invention with those of a high performance epoxy ester primer show that on balance the two compositions have equal properties. The undercoat comprising the novel derivative had the additional advantage that it could be sprayed at very high solids — in this case, the undercoat was sprayed at 80% solids by weight and the epoxy primer at 45% solids by weight.

EXAMPLE 5

Preparation of a water-borne coating composition from the derivative prepared in Example 1.

A mill base was prepared by sand grinding the following components until a dispersion of particle size 10–15 micron (as measured on a Hegmann gauge) was achieved.

| Rutile titanium dioxide       | 90.0  | parts |
| ----------------------------- | ----- | ----- |
| Barytes                       | 400.0 | ''    |
| Silica                        | 10.0  | ''    |
| Hexamethoxymethyl melamine*   | 39.0  | ''    |
| Ethylene glycol monobutyl ether⁺ solvent | 112.5 | ''    |

*A proprietary product called "Cymel" 300 (registered trade mark) was used.
⁺A proprietary product called butyl "Cellsolve" (registered trade mark) was used.

A paint composition was prepared by mixing together the following components.

| Millbase (from above)                 | 52.0 | parts |
| ------------------------------------- | ---- | ----- |
| Derivative (from Example 1)           | 22.9 | ''    |
| Dimethyl ethanolamine (1:1 solution in water) | 3.7  | ''    |
| Butyl "Cellsolve"                     | 2.0  | ''    |
| Distilled water                       | 20.3 | ''    |

The resultant coating composition had a solids content of 65% by weight at a viscosity of 1.8 poise.

We claim:

1. A derivative of an autoxidisable maleinised monocarboxylic fatty acid, said derivative being the product obtained by heating together:

a. an autoxidisable maleinised monocarboxylic fatty acid comprising the reaction product of 1 mol of maleic anhydride per mol of monocarboxylic fatty acid and b. a diol selected from 2,2-bis (4-hydroxy cyclohexyl)propane and the reaction product of 1 mol of 2,2-bis (p-hydroxy phenyl)propane with 2 mol of an alkylene oxide selected from ethylene, propylene and butylene oxide, so as to form a mono-ester of said diol and open the maleic anhydride ring, and reacting the resulting ring-opened product by heating with c. an alkylene oxide selected from ethylene, propylene and butylene oxide and a compound of the formula:

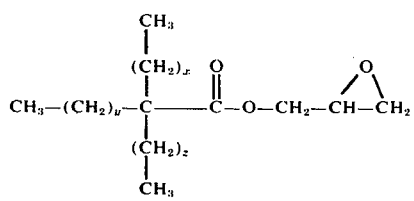

where $x$, $y$ and $z$ are integers and $x + y + z = 4-6$ inclusive, so as to obtain a mono-ester of said oxide (c), said derivative being characterised by having both carboxyl and hydroxyl groups, and an acid value of 40–100 KOH/gm and being further characterised by the presence of a mono-ester linkage of (b) and a mono-ester linkage of (c).

2. The derivative of claim 1 wherein (c) is a compound of the formula:

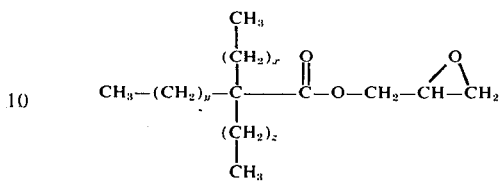

where $x$, $y$ and $z$ are integers and $x + y + z = 4-6$ inclusive.

* * * * *